(No Model.)
S. A. JOHNSON.
METHOD OF MANUFACTURING FANCY CONFECTIONERY.
No. 545,698. Patented Sept. 3, 1895.
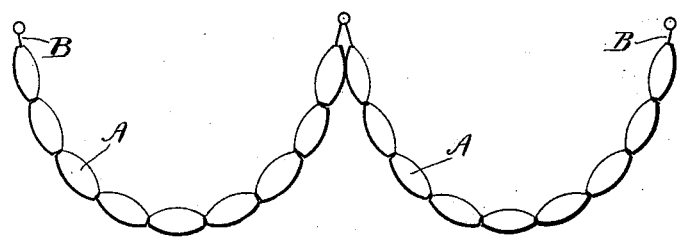
Fig. 1.
Fig. 2.
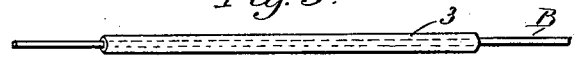
Fig. 3.
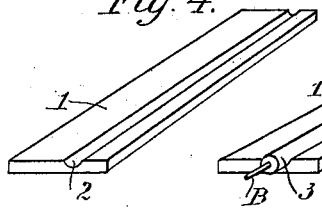 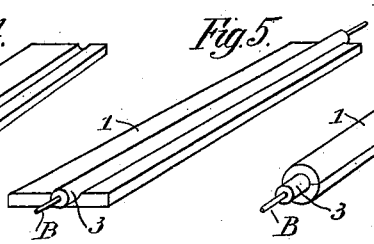 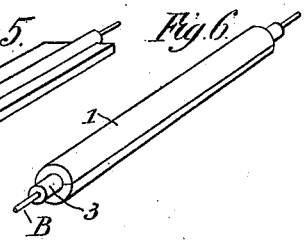
Fig. 4.   Fig. 5.   Fig. 6.
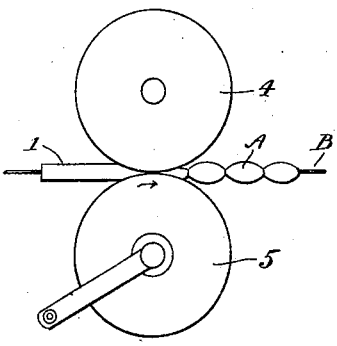
Fig. 7.
WITNESSES:
W. W. Shaw
F. B. Packard
INVENTOR
Samuel A. Johnson,
BY Murphey & Metcalf
ATTORNEYS

UNITED STATES PATENT OFFICE.

SAMUEL A. JOHNSON, OF PENN YAN, NEW YORK.

METHOD OF MANUFACTURING FANCY CONFECTIONERY.

SPECIFICATION forming part of Letters Patent No. 545,698, dated September 3, 1895.

Application filed January 28, 1895. Serial No. 536,414. (No specimens.)

*To all whom it may concern:*

Be it known that I, SAMUEL A. JOHNSON, of Penn Yan, New York, have invented certain new and useful Improvements in Methods of Manufacturing Fancy Confectionery; and I hereby declare the following to be a full, clear, and exact description thereof, reference being had to the accompanying drawings, forming part of this specification.

The object of my invention is the production of confectionery in such form as to present an attractive appearance, so that it can be used for decorative purposes and when its purpose in this respect is served can be eaten by the purchaser; and my invention consists in the improved process of manufacturing the same, which is hereinafter described, and specifically pointed out in the claim.

Referring to the accompanying drawings, Figure 1 is a view showing the confectionery or candy supported upon a thread and arranged in festoons for decorative purposes. Fig. 2 is a slightly-enlarged view showing more clearly the manner in which the candy is fixed upon the support. Fig. 3 is a perspective view of the thread and carrying tube employed in my improved process, and Figs. 4, 5, 6, and 7, illustrate the different steps in my improved process and the mechanism by which it is carried into effect.

In said drawings, A represents the separate pieces of confectionery, which, as shown, are spheroidical in shape. They may, however, be of any pleasing form or configuration, and may be variously colored and ornamented to suit the taste of the purchasers. They are mounted axially upon the thread or flexible support B. Ordinary cotton twine suitably prepared to prevent its adhesion to the candy may be employed for this purpose. As thus manufactured the candy may be used for decorative purposes in numerous ways. It may, for example, be hung in festoons from walls or Christmas-trees. Pillars may be wound with it. In fact, the uses to which it may thus be put are endless, and when it has served its purpose in this respect it may be removed piece by piece from the thread and eaten.

The following is the process which I employ in carrying my invention into effect: The candy having been suitably compounded, cooked, colored, and flavored is, while in a plastic condition, formed into a flat, narrow strip 1 of any suitable length and laid upon a bench, table, or other flat surface. A groove 2, as shown in Fig. 4, is then formed near one edge of the strip by means of any suitable implement. The thread B is then inserted in a tube 3 of brass or other proper material, and extends through the same, projecting somewhat beyond each end. To prevent the adhesion of the tube to the candy, flour, or other substance may be placed in the groove 2, and the tube 3 inclosing thread B is laid in the groove, as shown in Fig. 5. The strip 1 is then folded over and around the tube so as to completely inclose the same, except where the ends of the tube project, as shown in Fig. 6. The tube 3 is then pulled out endwise, leaving the thread B in the groove which it occupied. The folded strip of candy, which is now approximately in the form of a cylindrical roll, is then passed between the revolving dies or rollers 4 5, which are provided with peripheral recesses formed to correspond with the shape the finished article is to assume, and which, as the strip passes between them, separate it into independent sections or drops, and compress the same around the thread sufficiently so that each piece or section shall normally retain its position on the thread, but may be pulled off lengthwise without in any manner defacing the remaining pieces or sections, and without rupturing the thread. After passing through the rollers the candy is allowed to harden and the finished article is ready for the consumer.

Having thus described my invention, what I claim as new, and desire to secure by Letters Patent, is—

The improved method of manufacturing candy adapted to be used for decorative purposes which consists in forming the same while in a plastic condition into a strip; then forming therein a groove or crease; then inserting in said groove or crease a tube inclosing a flexible thread; then folding said strip around said tube; then withdrawing said tube endwise and leaving the thread inclosed within said strip; then separating the candy into separate longitudinal sections and compressing each section around the thread by passing the same between dies, and then allowing the candy to harden, substantially as herein described.

SAMUEL A. JOHNSON.

Witnesses:
LILLIAN E. AGAN,
WM. T. MORRIS.